United States Patent [19]

Chen et al.

[11] Patent Number: 6,097,699
[45] Date of Patent: Aug. 1, 2000

[54] METHOD AND SYSTEM FOR MONITORING BROADBAND QUALITY OF SERVICES

[75] Inventors: Thomas M. Chen, Dallas, Tex.; Stephen S. Liu, Acton; Michael J. Procanik, Natick, both of Mass.

[73] Assignee: GTE Laboratories Incorporated, Waltham, Mass.

[21] Appl. No.: 09/092,605

[22] Filed: Jun. 5, 1998

[51] Int. Cl.[7] .......................... G01R 31/08; G08C 15/00; G06F 11/00
[52] U.S. Cl. ............................................ 370/231; 370/395
[58] Field of Search .................................... 370/229, 230, 370/231, 232, 233, 234, 235, 236, 389, 395, 398, 399, 396, 397

[56] References Cited

U.S. PATENT DOCUMENTS

| | | | |
|---|---|---|---|
| 5,487,061 | 1/1996 | Bray . | |
| 5,487,072 | 1/1996 | Kant . | |
| 5,515,363 | 5/1996 | Ben-Nun et al. | 370/232 |
| 5,519,689 | 5/1996 | Kim | 370/232 |
| 5,563,874 | 10/1996 | Kant . | |
| 5,592,432 | 1/1997 | Vishlitzky . | |
| 5,649,110 | 7/1997 | Ben-Nun et al. | 370/351 |
| 5,694,390 | 12/1997 | Yamato et al. | 370/230 |
| 5,748,612 | 5/1998 | Stoevhase et al. | 370/230 |
| 5,787,473 | 7/1998 | Vishlitzky . | |
| 5,835,484 | 11/1998 | Yamato et al. | 370/230 |

OTHER PUBLICATIONS

ITU–T Rec.I.121, "Broadband aspects of ISDN," Melbourne, Nov. 1988.

J. Case, et al., "A Simple Network Management Protocol (SNMP)," Internet RFC 1157, May 1990.

ITU–T Rec. I.610, "B–ISDN Operations and Maintenance Principles and Functions," Geneva, Jul. 1995.

W. Lewandowski, C. Thomas, "GPS Time Transfer," Proc. of IEEE, vol. 79, Jul. 1991, pp 991–1000.

D. Mills, "precision Synchronization of Computer Network Clocks," CompCommum Rev., vol. 24, Apr. 1994, pp 28–43.

*Primary Examiner*—Ajit Patel
*Assistant Examiner*—Bob A. Phunkulh
*Attorney, Agent, or Firm*—Leonard Charles Suchyta

[57] ABSTRACT

A method and system for monitoring a first virtual circuit in an asynchronous transmission mode (ATM) network comprises the steps of establishing in the network a second virtual circuit with the same path and QoS parameters as the first virtual circuit, and monitoring the first virtual circuit by determining the QoS parameters of the second virtual circuit. Specifically, a monitoring station determines the QoS parameters of the second virtual circuit by inserting monitoring information in cells transmitted and received on the second virtual circuit. The monitoring station inserts the monitoring information immediately before transmitting each cell and immediately after receiving each cell. Furthermore, the monitoring station compares the QoS parameters of the second virtual circuit with the QoS parameters of the first virtual circuit to determine network alarm information.

25 Claims, 14 Drawing Sheets

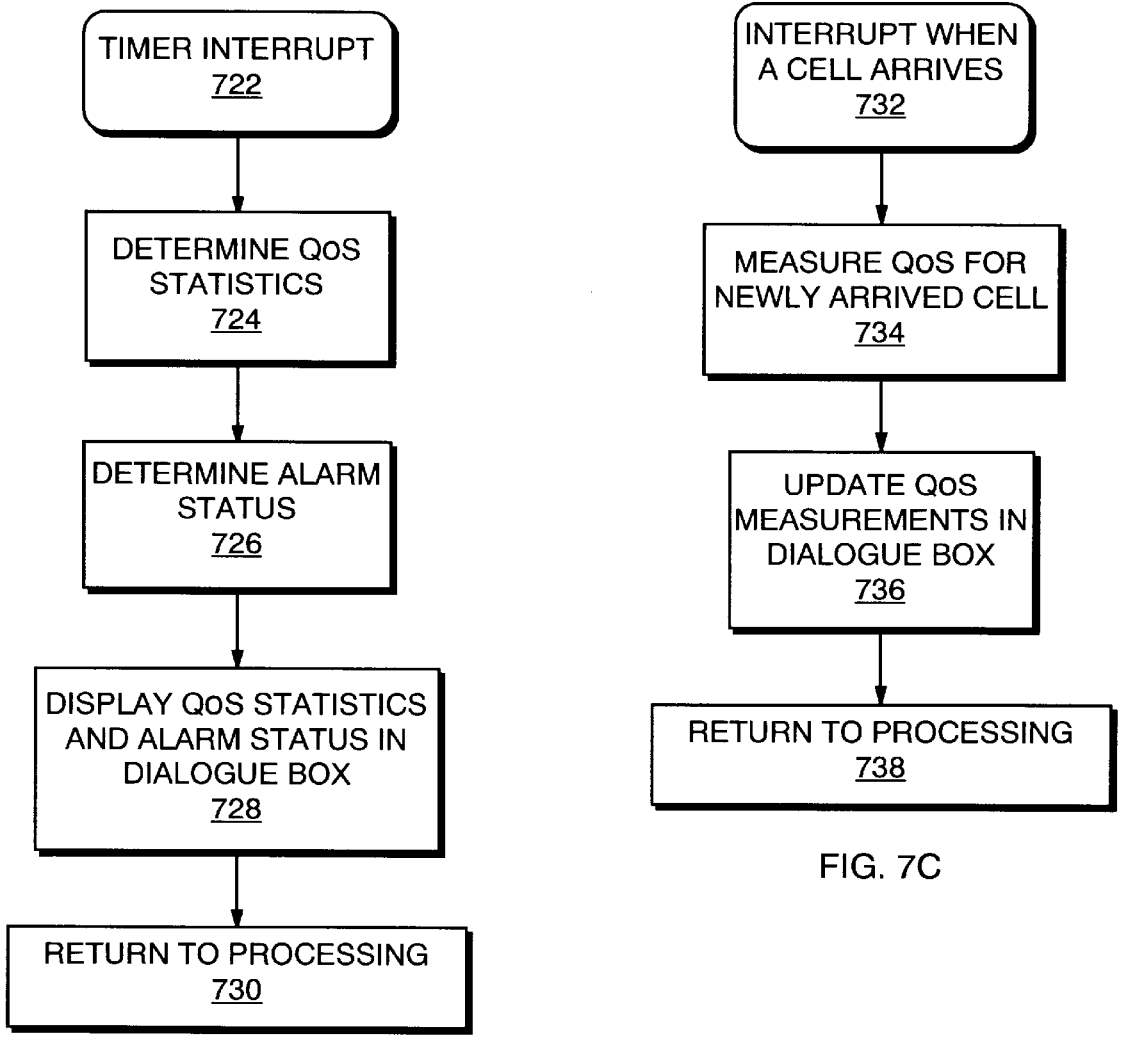

METHOD AND SYSTEM FOR MONITORING BROADBAND QUALITY OF SERVICES

BACKGROUND OF THE INVENTION

1. Field of the Invention

The present invention relates to monitoring of asynchronous transfer mode (ATM) networks, and more particularly, to in-service monitoring of end-to-end Quality of Service (QoS) in ATM networks.

2. Background of the Art

In an ATM network, a user can communicate information with another user through a connection, referred to as a virtual circuit, established in the network. The connection can carry voice, video, and data in fixed-size cells of 53-bytes, which include a 5-byte header and a 48 byte payload field. The connection can support a wide range of services defined by a set of quality of service (QoS) parameters.

The ATM Forum standard, *Traffic Management Specification Version 4.0*, ATM Forum/95-0013R10, February 1996, defines a set of QoS parameters that characterize the end-to-end performance of a connection in an ATM network. When establishing a connection through an ATM network, a user negotiates with the network the set of QoS parameters that characterize the connection. The particular set of QoS parameters depends on the type of service that the user requests from the network. These services include constant bit-rate (CBR), variable bit-rate (VBR), available bit-rate (ABR), and unspecified bit-rate (UBR).

Specifically, through a call admission control procedure, a user signals a request for a new connection in the network, and the network makes a decision to accept or reject the new connection request depending on the specified QoS and the available network resources. Generally, the network accepts a new connection if the network determines that the available network resources will be sufficient to satisfy the specified QoS. If the network accepts the new connection, the network implicitly agrees to a traffic contract that requires the network to sustain the specified QoS as long as the traffic on the connection conforms to the negotiated traffic contract.

The negotiated traffic contract underlaying a connection underscores the need for monitoring and verifying the actual QoS provided by the ATM network. Existing methods for monitoring the QoS in a connection require the users to measure the end-to-end performance of the connection by exchanging monitoring information in the ATM adaptation layer (AAL) or higher protocol layers. For example, users can exchange timing information to measure the end-to-end delay for transmission of cells in a connection.

The existing methods for monitoring the QoS in connections, however, have several disadvantages. First, ATM network switches, routers, and bridges can only access the cell header but not the cell payload. Furthermore, ATM networks cannot use the cell header for performance monitoring because the cell header has been designed to be short and simple to make fast cell switching or relaying possible. Finally, to reduce the processing in ATM switches, an ATM cell has been deliberately designed not to support a cell header field that would include performance monitoring information such as cell sequence numbers and time-stamps.

Second, when performing QoS monitoring, network management systems generally poll ATM switches for performance monitoring information. However, the performance monitoring information collected by the network management systems is generally specific to each switch, and does not include end-to-end QoS monitoring information.

Third, network operators commonly use specialized high-speed testing equipment to test and monitor connections in an ATM network. However, existing testing equipment for broadband networks, such as ATM networks, are typically expensive, complex to use, and intended more for controlled laboratory testing than large scale field application.

ITU-T Rec. 1.610, B-ISDN *Operation and Maintenance Principles and Functions*, Geneva, July 1995, defines a monitoring method, referred to as an operations and maintenance (OAM) method, for in-service performance monitoring in an ATM network. The OAM method inserts OAM cells between blocks of user generated cells. To use the OAM method, ATM switches must recognize the OAM cells and must relay them with the user cells. When a switch that functions as an end-point node receives an OAM cell, the switch processes the OAM cell and inserts its monitoring information in a new OAM cell, which the switch then transmits in the backward direction. Due in part to the additional processing and cell handling complexity associated with the OAM method, most existing ATM switches do not support these capabilities yet.

Furthermore, to reduce costs and integrate network management functions into a single hardware platform, others have attempted to implement monitoring systems for measuring the end-to-end QoS in a connection or a group of connections using a standard computer such as, a personal computer (PC). However, because of the multitasking operating environment of a PC, other tasks such as, user applications, screen savers, disk caching or even mouse movements, may contend with the monitoring system for CPU cycles, and thus, may restrict the accuracy and consistency of monitoring measurements that are time-sensitive.

For example, the monitoring system must time-stamp outgoing cells immediately prior to transmitting the outgoing cells into the network, and similarly, must time-stamp the incoming cells immediately after the monitoring system receives the incoming cells from the network. The resource sharing of the PC's operating system, however, may result in inaccuracies when the monitoring system calculates the time-stamps. Specifically, the monitoring system may not be able to calculate a time-stamp immediately upon arrival of an incoming cell, or may not be able to calculate a time-stamp immediately prior to the transmission of an outgoing cell, in part, because the PC's operating system may have already allocated the current CPU cycles to another task, causing the monitoring system to wait for free CPU cycles.

Thus, it is desirable to have a method and system for in-service monitoring of the end-to-end QoS in a connection or a group of connections in an ATM network without the above-mentioned disadvantages.

SUMMARY OF THE INVENTION

Methods and systems consistent with the present invention, as embodied and broadly described herein, monitor a first virtual circuit in an asynchronous transmission mode (ATM) network by establishing in the network a second virtual circuit with the same path and QoS parameters as the first virtual circuit, and monitoring the first virtual circuit by determining the QoS parameters of the second virtual circuit. Specifically, such methods and systems determine the QoS parameters of the second virtual circuit by inserting monitoring information in cells transmitted on the second virtual circuit. Furthermore, the methods and systems compare the QoS parameters of the second virtual circuit with the QoS parameters of the first virtual circuit to determine network alarm information.

Methods and systems consistent with the present invention, as embodied and broadly described herein, time-stamp a cell prior to transmission in an ATM network by writing the cell into a memory, writing the current time into the payload field of the cell immediately prior to generating an interrupt signal, and in response to the interrupt signal, transmitting the cell into the network.

Methods and systems consistent with the present invention, as embodied and broadly described herein, time-stamp a cell after receiving the cell from an ATM network by generating an interrupt signal, in response to the interrupt signal storing the current time into a memory, writing the received cell into the memory, and copying the stored time into the payload field of the cell.

Methods and systems consistent with the present invention, as embodied and broadly described herein, have the advantage of accurately and consistently monitoring the end-to-end QoS parameters of a virtual circuit or group of virtual circuits by using a standard PC. In addition, such methods and systems have the advantage of determining QoS parameters of virtual circuits without interrupting service on the virtual circuits, and thus, are non-intrusive and are transparent to network users. Finally, the methods and systems are compatible with any existing ATM network without requiring the implementation of special and expensive functionalities in network switches.

This summary and the following description of the invention should not restrict the scope of the claimed invention. Both provide examples and explanations to enable others to practice the invention. The accompanying drawings, which form part of the description of the invention, show several embodiments of the invention, and together with the description, explain the principles of the invention.

BRIEF DESCRIPTION OF THE DRAWINGS

In the Figures:

FIGS. 7a, 7b, and 7c illustrate flow charts of the steps that a traffic analyzer in a monitoring system performs in accordance with an embodiment of the invention;

DETAILED DESCRIPTION

The following description of embodiments of this invention refers to the accompanying drawings. Where appropriate, the same reference numbers in different drawings refer to the same or similar elements.

Methods and systems consistent with the present invention monitor a first virtual circuit (VC) in an ATM network by establishing in the network a second VC with the same path and quality of service (QoS) parameters as the first VC, and monitoring the first VC by determining the QoS parameters of the second VC. Specifically, a monitoring station determines the QoS parameters of the second VC by inserting monitoring information, for example, a transmission or receive time-stamp and a sequence number, in cells that the monitoring station transmits and receives on the second VC. The monitoring station then compares the QoS parameters of the second VC with the QoS parameters of the first VC to determine network alarm information.

With respect to insertion of monitoring information in cells, an adapter driver program in the monitoring station time-stamps a cell immediately prior to transmitting the cell into the network. Specifically, the adapter driver writes the cell into the memory of a network adapter card and time-stamps the payload field of the cell immediately prior to generating an interrupt signal in the adapter card. In response to the interrupt signal, a firmware in the adapter card then transmits the cell into the network.

The adapter driver program also time-stamps a cell immediately after receiving the cell from the network. Specifically, the adapter card firmware receives the cell from the network and immediately generates an interrupt signal in the monitoring station. In response to the interrupt signal, the adapter driver immediately time-stamps the payload field of the cell.

NETWORK ARCHITECTURE

Figure 1:
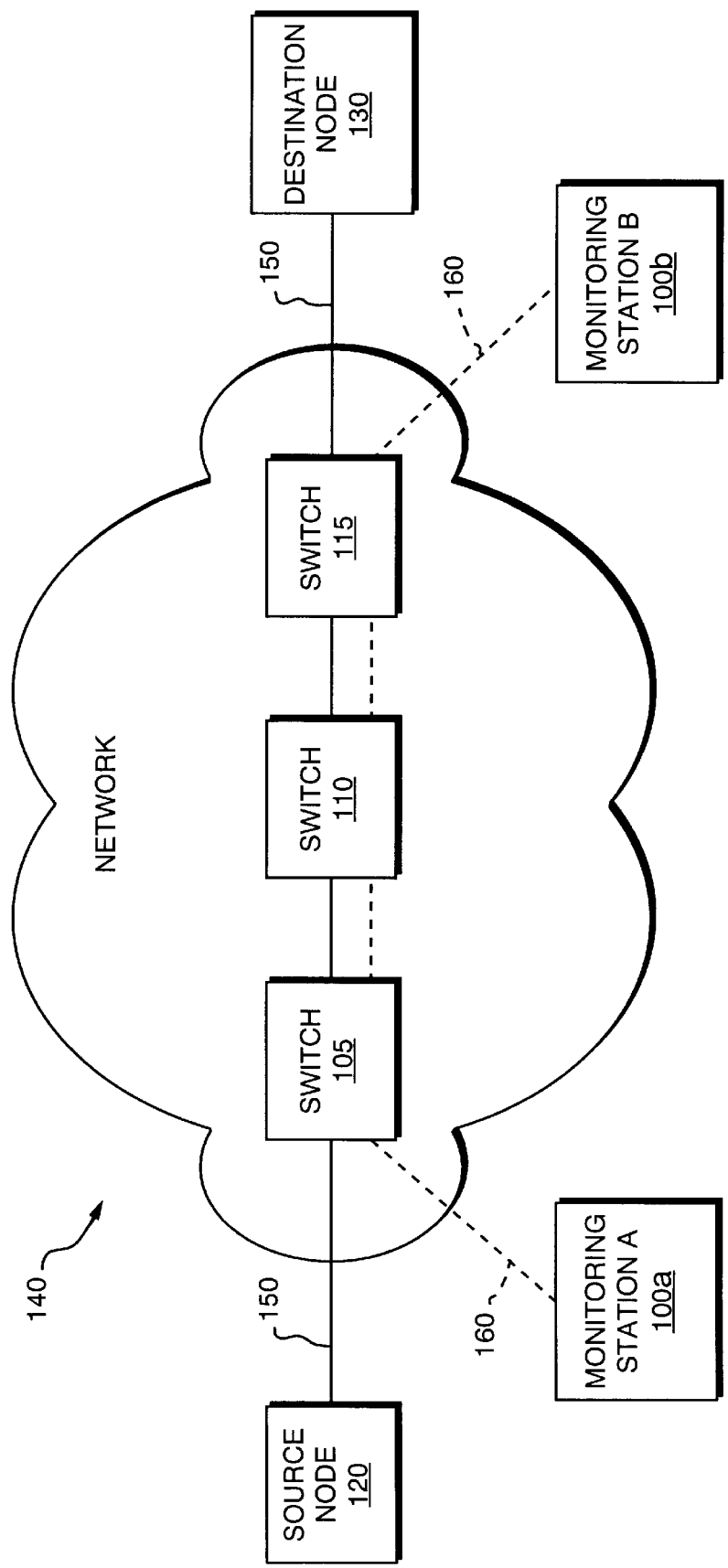
FIG. 1 illustrates a block diagram of a communications network with monitoring stations for monitoring a virtual circuit in accordance with an embodiment of the invention.

FIG. 1 illustrates a block diagram of a communications network 140 in accordance with an embodiment of the invention. As shown, network 140 comprises monitoring stations 100A and 100B, source node 120, destination node 130, and switches 105, 110, and 115. Specifically, source node 120 communicates with destination node 130 through virtual circuit (VC) 150, which passes through switches 105, 110, and 115. Monitoring station 100A communicates monitoring information with monitoring station 100B through virtual circuit (VC) 160, which has the same path through switches 105, 110, and 115 and QoS parameters as VC 150. Accordingly, monitoring station 100A may monitor the end-to-end QoS in VC 150 by monitoring the end-to-end QoS in VC 160.

Monitoring station 100A inserts monitoring information into the payload of each cell, and transmits the cells on VC 160. The cells pass through switches 105, 110, and 115, which, for example, may be ATM switches, and arrive at monitoring station 100B. Monitoring station 100B transmits each cell back to monitoring station 100A. When monitoring station 100A receives the cells back, monitoring station 100A measures the end-to-end QoS in VC 150 based on the round-trip transmission time of the cells. Alternatively, in another embodiment, monitoring station 100B may also insert monitoring information into the payload of the cells before transmitting the cells back to monitoring station 100A. In this alternate embodiment, monitoring station 100A can measure the end-to-end QoS in VC 150 based on one-way transmission time of the cells.

Figure 2:
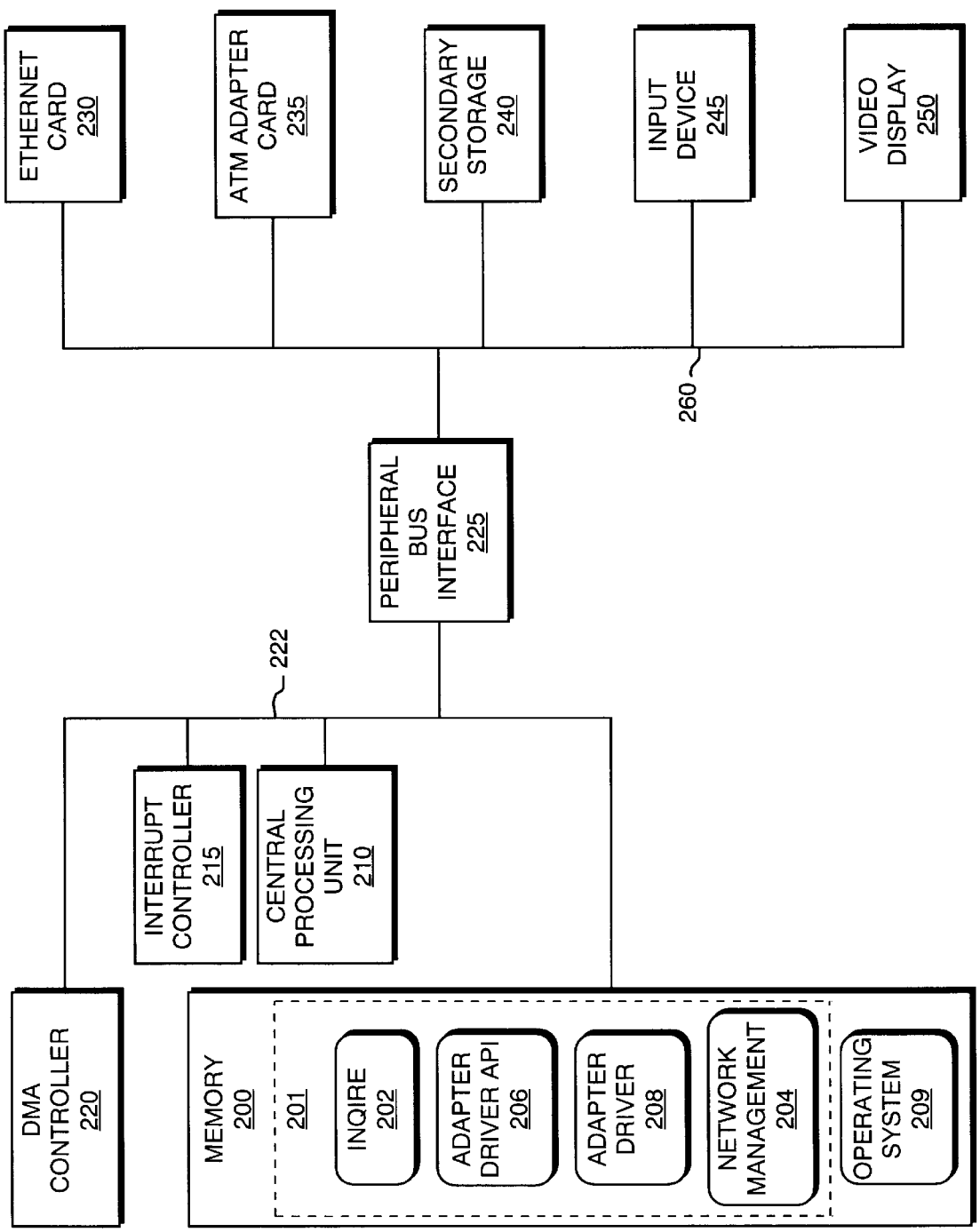
FIG. 2 illustrates a block diagram of a monitoring station in accordance with an embodiment of the invention.

FIG. 2 illustrates a block diagram of a monitoring station, for example, monitoring station 100A, in accordance with an embodiment of the invention. Monitoring station 100A may include a personal computer (PC), having a memory unit 200, central processing unit (CPU) 210, interrupt controller 215, direct memory access (DMA) controller 220, high speed bus 222, peripheral bus interface 225, peripheral bus 260, ethernet card 230, adapter card 235, secondary storage 240, input device 245, and video display 250. Memory unit 200, CPU 210, interrupt controller 215, and DMA controller 220 interface with each other via high speed bus 222. Furthermore, memory unit 200, CPU 210, interrupt controller 215, and DMA controller 220 interface with peripheral bus 260, ethernet card 230, adapter card 235, secondary storage 240, input device 245, and video display 250 via peripheral bus interface 225.

Memory unit 200 comprises a monitoring system 201 and operating system 209, each of which includes a set of instructions that CPU 210 executes. Memory unit 200 may, for example, include a 32 Mbytes random access memory (RAM), and CPU 210 may, for example, include a 200 MHz Pentium processor. Monitoring system 201 includes a monitoring program (INQIRE) 202, network management program 204, adapter driver application program interface (API) 206, and adapter driver 208. Operating system 209 may include Windows NT® operating system. API 206 may include WinSock2™ software. Both the operating system 209 and API 206 are from Microsoft Corporation.

Secondary storage 240 comprises computer readable medium such as a disk drive and a tape drive. From the tape drive, software and data may be loaded onto the disk drive, which can then be copied into memory unit 200. Similarly, software and data in memory unit 200 may be copied onto the disk drive, which can then be loaded onto the tape drive.

Figure 3:
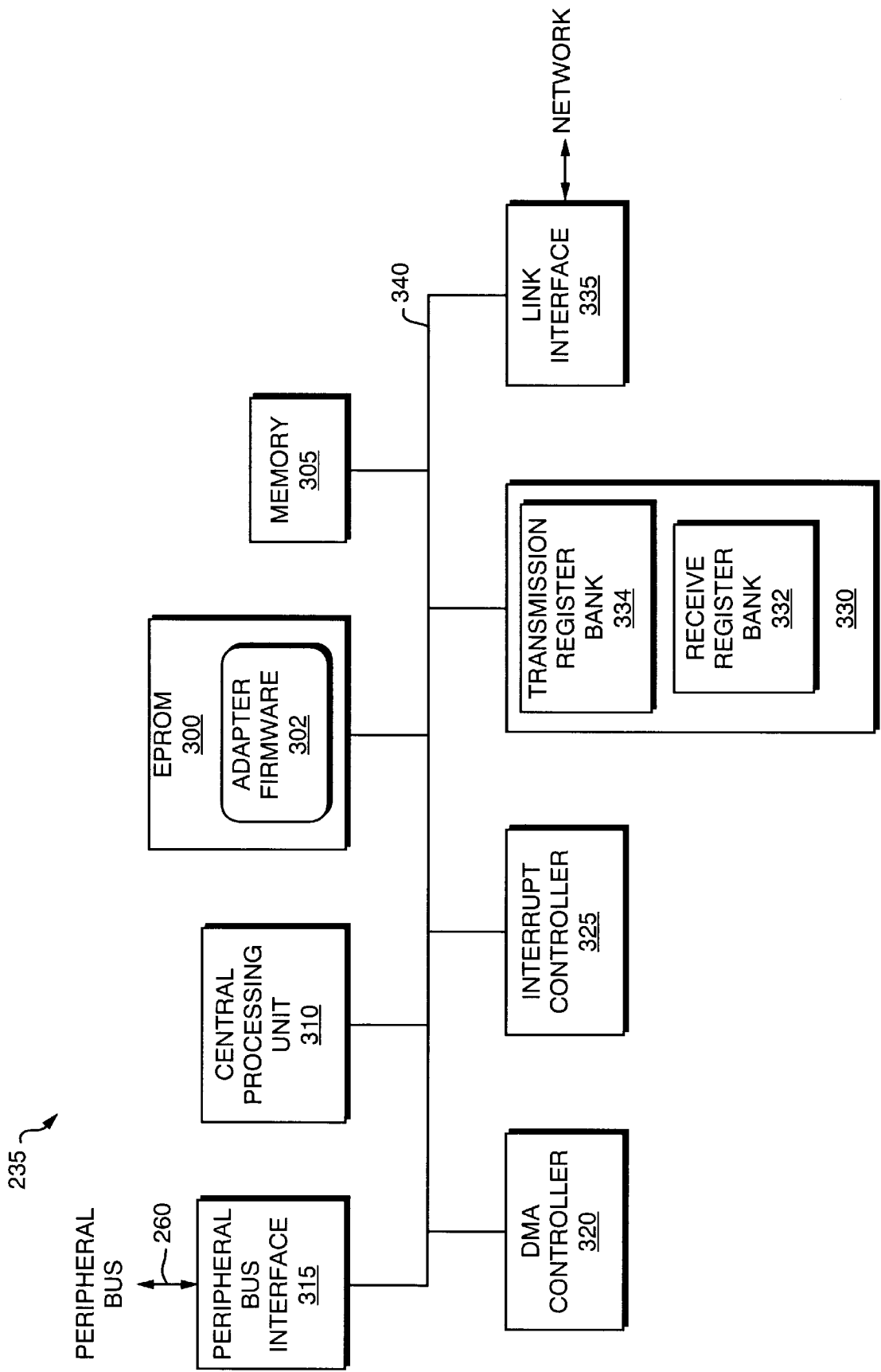
FIG. 3 illustrates a block diagram of a network adapter card in accordance with an embodiment of the invention.

FIG. 3 illustrates a block diagram of adapter card 235 in accordance with an embodiment of the invention. As shown, adapter card 235 comprises electrically programmable read only memory (EPROM) 300, memory unit 305, central processing unit (CPU) 310, peripheral bus interface 315, direct memory access (DMA) controller 320, interrupt controller 325, register bank 330, and link interface 335, all of which interface with adapter bus 340.

EPROM 300 comprises adapter firmware 302, which CPU 310 executes. Memory unit 305 comprises data and a set of operating instructions, which CPU 310 also executes. Register bank 330 comprises a transmission (Tx) register bank 334 and a receive (Rx) register bank 332. Tx register bank 334 and Rx register bank 332 each include a pointer register and a command register. Peripheral bus interface 315 interfaces with peripheral bus 260. Adapter card 235 interfaces with network 140 via link interface 335.

Figure 4:
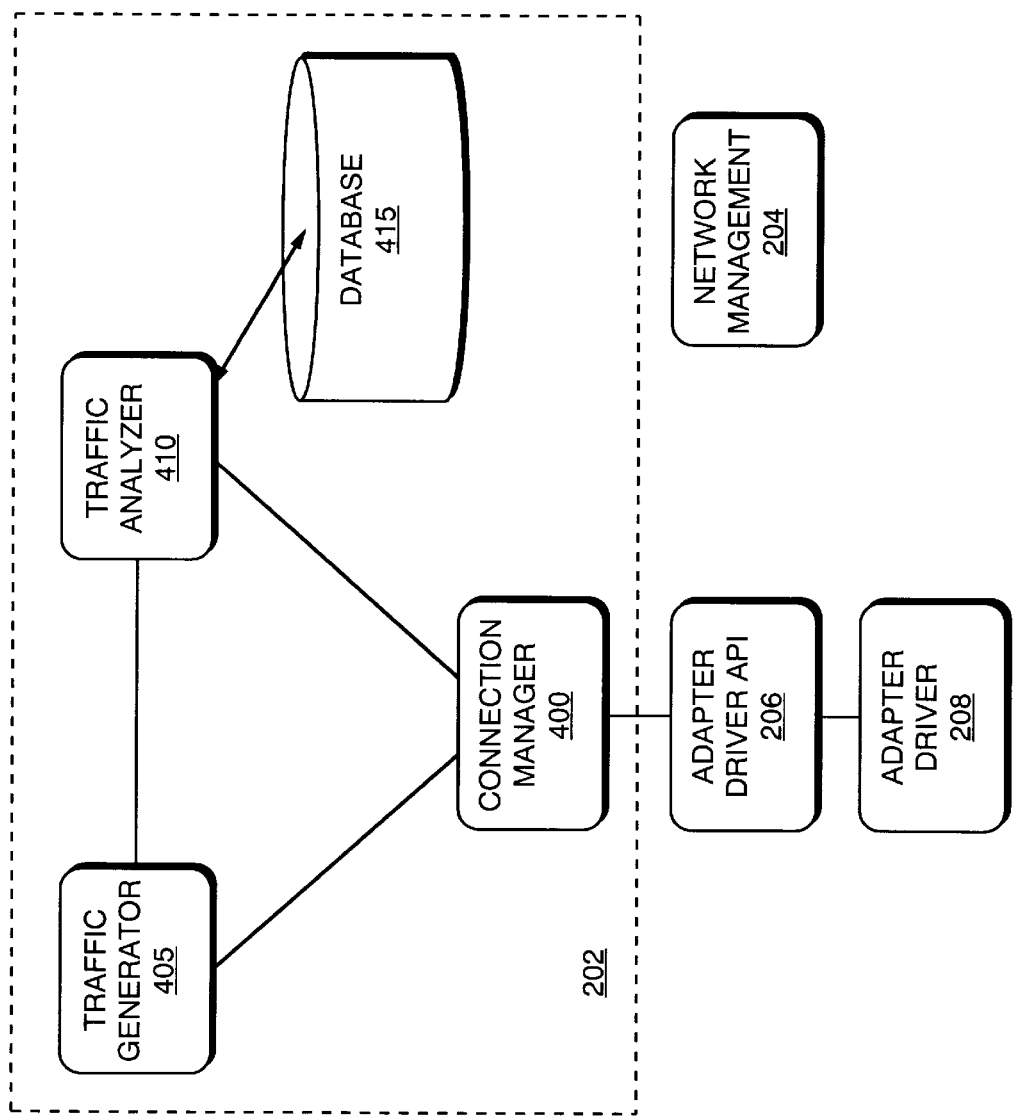
FIG. 4 illustrates a block diagram of a monitoring system in accordance with an embodiment of the invention.

FIG. 4 illustrates a block diagram of a monitoring system 201 in accordance with an embodiment of the invention. As shown, monitoring system 201 includes monitoring program network management program 204, INQIRE 202, API 206, and adapter driver 208. Network management program 204 establishes, maintains, and terminates permanent virtual circuits between any two points in network 140. Specifically, network management program 204 communicates with switches 105, 110, and 115 via ethernet card 230. Ethernet card 230 may interface with switches 105, 110, and 115 via, for example, an Internet Protocol (IP) network (not shown). Network management program 204 may establish VC 160 by sending switch specific commands to each switch 105, 110, and 115, specifying the input port and output port of each switch through which VC 160 must pass. Furthermore, network management program 204 establishes VC 160 with the same path and QoS parameters as VC 150. Network management program 204 may include switch configuration software, which may be specific to each switch and is generally provided by the particular switch manufacturer.

INQIRE 202 generally transmits and receives cells, determines and analyzes real-time QoS measurements, determines and analyzes QoS statistics, graphically displays the QoS measurement and the QoS statistics, displays alarms for baseline QoS violations, and stores the QoS measurements and the QoS statistics in database 415. Furthermore, INQIRE 202 invokes adapter driver 208 via API 206 to establish a socket to VC 160 and to insert monitoring information into the payload of each cell transmitted and received on VC 160. To enhance accuracy of the monitoring information inserted into the payload a cell, high priority may be assigned to INQIRE 202 and adapter driver 208.

INQIRE 202 includes connection manager (CM) 400, traffic generator (TG) 405, traffic analyzer (TA) 410, and database 415. CM 400 generally coordinates communications between TA 410 and TG 405, initiates and terminates monitoring sessions, and handles the main graphical user interface. TG 405 generally composes the payload of outgoing cells and passes the cells to CM 400 for transmission onto network 140. TA 410 generally determines QoS statistics, analyzes and stores QoS statistics in database 415, and provides a graphical user interface for displaying QoS statistics and alarms. Flow charts of the steps that CM 400, TG 405, and TA 410 each performs will be shown in detail below.

Figure 5:
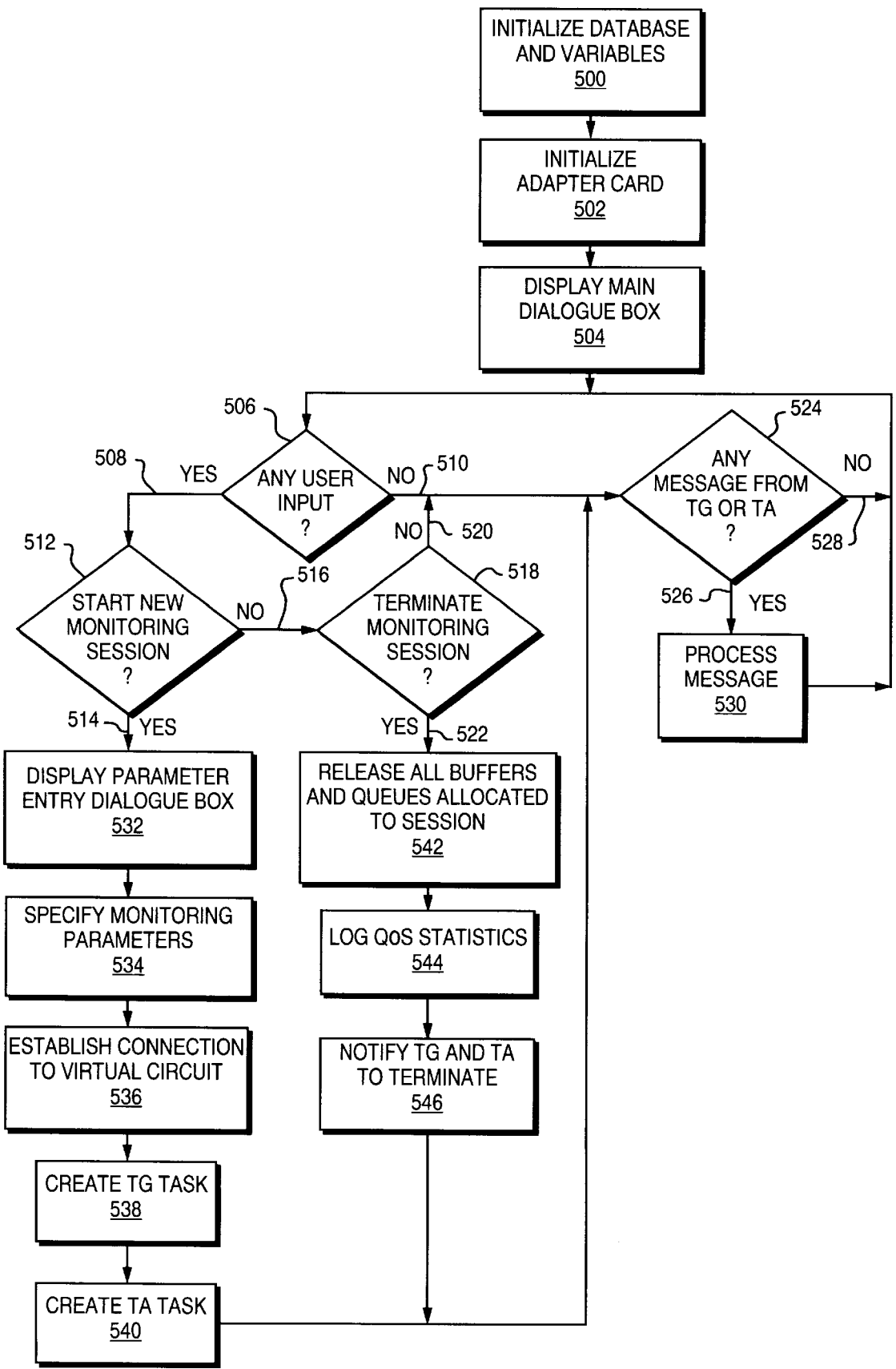
FIG. 5 illustrates a flow of chart of the steps that a connection manager in a monitoring system performs in accordance with an embodiment of the invention.

FIG. 5 is a flow of chart of the steps that CM 400 performs in accordance with an embodiment of the invention. CM 400 initializes database 415 and program variables (step 500). CM 400 then initializes adapter card 235 (step 502). CM 400 then displays a main dialogue box (step 504), and prompts the user for input (step 506).

If the user inputs a request (step 508), CM 400 then determines whether the user requests a new monitoring session (step 512). If the user requests a new monitoring session (step 514) to monitor, for example, VC 150, which is established between source node 120 and destination node 130 in network 140, CM 400 displays a dialogue box for inputting monitoring parameters (step 532).

CM 400 then prompts the user to specify the following monitoring parameters (step 534): a virtual path identifier (VPI), a virtual circuit identifier (VCI), which identifies, for example, VC 160, and a set of baseline QoS parameters, which include, for example, cell transfer delay, cell delay variation, and cell loss ratio. The user must specify a VPI and a VCI for VC 160, which network management program 204 has established with the same path as VC 150. Similarly, the user must specify the baseline QoS for VC 160 so that the baseline QoS match the negotiated QoS of VC 150. The user may also specify the starting time, duration, the termination time of the monitoring session, and the rate at which monitoring station 100A should generate cells on VC 160.

CM 400 then establishes a connection to VC 160, which network management program 204 has already established (step 536). Specifically, CM 400 invokes adapter driver 208 to establish the desired connection via adapter card 235. CM 400 then creates task TG 405 (step 538) and task TA 410 (step 540). Then, CM 400 checks for any messages from TG 405 and TA 410 (step 524).

If the user does not input a request (step 510), then CM 400 determines whether there are any messages from TG 405 or TA 410 in inter-process message queues, which are in memory unit 200 (step 524). If there is a message in any of the inter-process message queues (step 526), CM 400 processes the message (step 530). Then, CM 400 checks for more user input, if any (step 506).

If user inputs a request (step 508) and the user does not request a new monitoring session (step 516), CM 400 determines whether the user requests to terminate a monitoring session (step 518). If the user does not request to terminate a monitoring session (step 520), CM 400 then checks for any messages from TG 405 and TA 410 (step 524). If the user requests to terminate a monitoring session (step 522), CM 400 releases all program buffers and queues allocated to the monitoring session (step 542). CM 400 then logs to database 415 QoS statistics that are measured in the monitoring session and that are in memory unit 200 (step 544). Then, CM 400 notifies TG 405 and TA 410 to terminate (step 546).

Figures 6A, 6B:
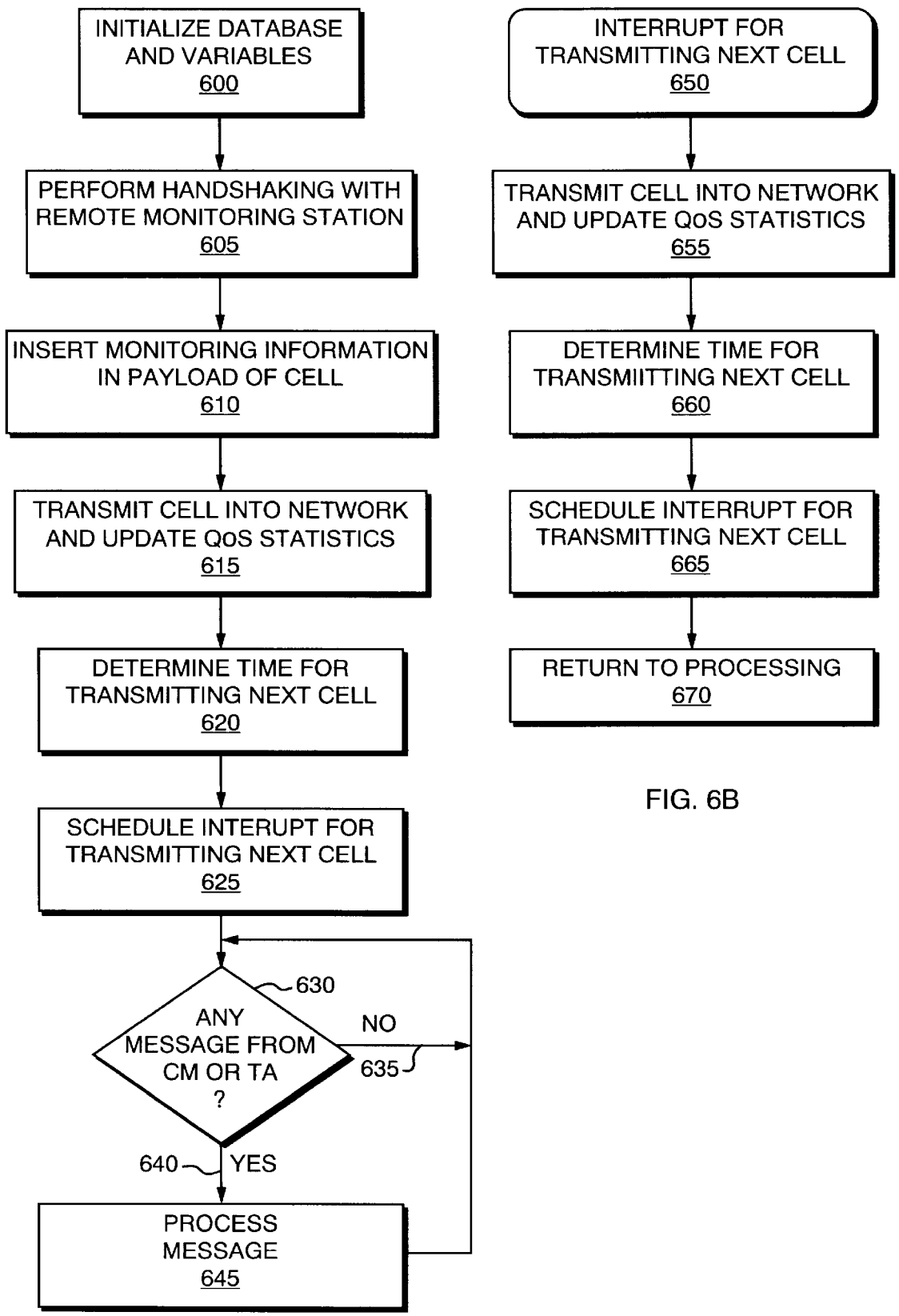
FIGS. 6a and 6b illustrate flow charts of the steps that a traffic generator in a monitoring system performs in accordance with an embodiment of the invention.

FIG. 6a is a flow chart of the steps that TG 405 performs in accordance with an embodiment of the invention. TG 405 initializes database 415 and program variables (step 600). TG 405 then performs protocol handshaking with remote monitoring station 100B via VC 160 (step 605). TG 405 then generates a 48-bytes cell payload, and inserts monitoring information into the payload by invoking adapter driver 208 (step 610). Specifically, the monitoring information may include, for example, a transmission time-stamp that represents the current time and a sequence number. The steps that adapter driver 208 performs to insert the transmission time-stamp in the payload of the cell are described below in detail.

TG 405 then immediately transmits the cell on VC 160 into network 140, and updates the QoS statistics for VC 160, which may, for example, include the total number of cells that TG 405 has transmitted (step 615). TG 405 then determines the transmission time of the next cell based on the rate of cell transmission, which is specified by the user and is stored in database 415 (step 620). TG 405 then schedules an interrupt for the transmission of the next cell (step 625).

TG 405 checks the inter-process message queues for any messages from CM 400 or TA 410 (step 630). If there is a message in any of the inter-process message queues (step 640), TG 405 processes the message (step 645). Then, TG 405 checks for more messages in the queues (step 630). If there is not a message in any of the queues (step 635), TG 405 continues to check for messages (step 630).

FIG. 6b is a flow chart of the steps that TG 405 performs when TG 405 receives an interrupt in accordance with an embodiment of the invention. At any point in time after step 625, TG 405 may receive an interrupt via interrupt controller 215 to transmit a cell (step 650). As explained above, TG 405 then generates a cell payload, and inserts monitoring information into the cell payload (step 655). Specifically, the monitoring information may include, for example, a time-stamp that represents the current time and a sequence number. TG 405 then transmits the cell on VC 160 into network 140, and updates the QoS statistics for VC 160 in database 415 (step 655). TG 405 then determines the time for transmitting the next cell based on the rate of cell transmission specified by the user (step 660). TG 405 then schedules an interrupt for the transmission of the next cell (step 665). Then, TG 405 returns to the point in processing, at which point TG 405 received the interrupt (step 670).

Figure 7A:
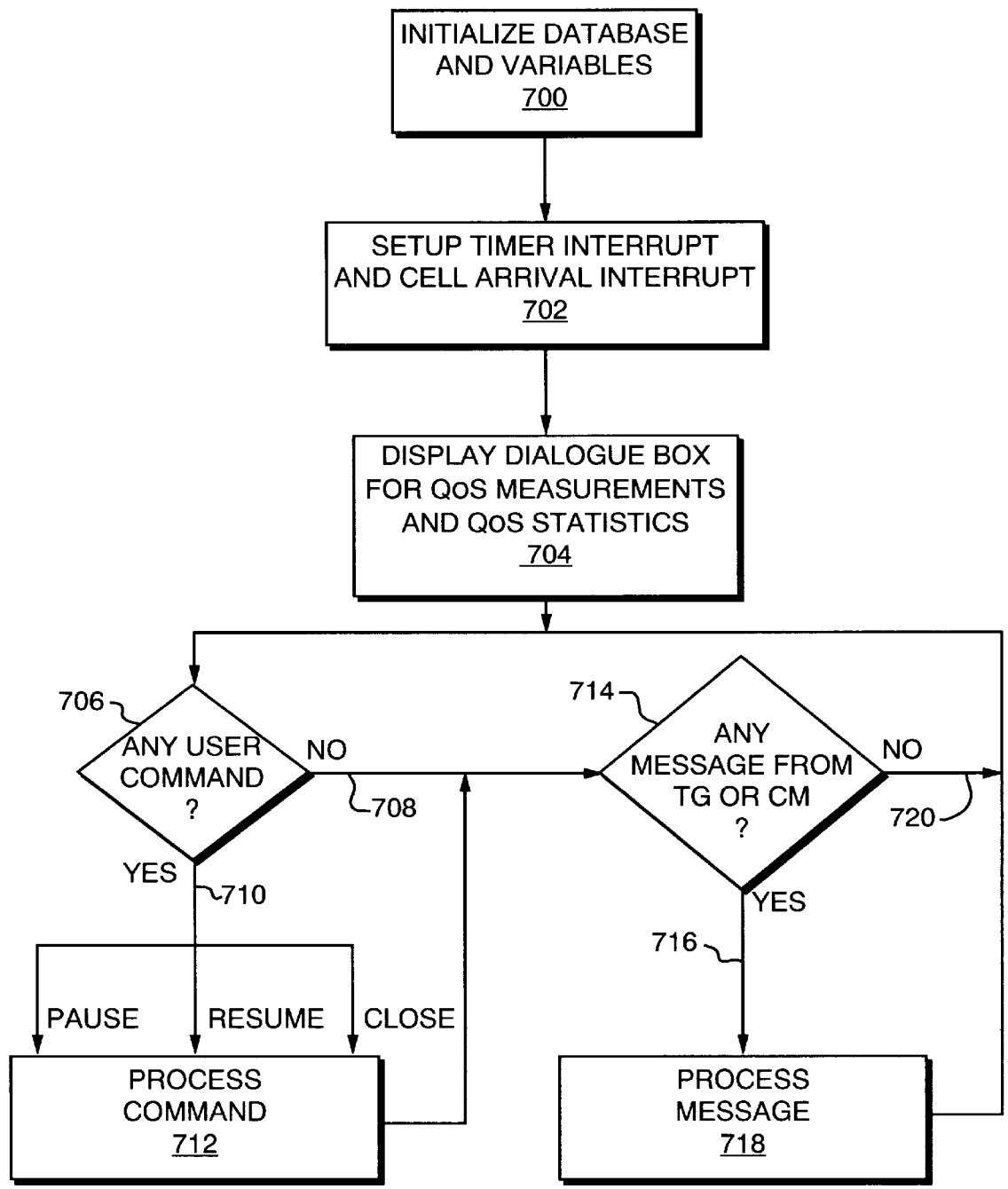

FIG. 7a is a flow chart of the steps that TA 410 performs in accordance with an embodiment of the invention. TA 410 initializes database and program variables (step 700). TA 410 then sets up two interrupts: a timer interrupt and a cell-arrival interrupt (step 702). Timer interrupt generates an interrupt in CPU 210 in fixed intervals, which may be set to, for example, 100 msec. Cell-arrival interrupt generates an interrupt in CPU 210 whenever adapter card 235 receives a cell from network 140. As shown below in detail, at a cell-arrival interrupt, TA 410 generally measures the QoS parameters for VC 160 based on the monitoring information in the payloads of the newly arrived cells, and at a timer interrupt, TA 410 generally re-computes the QoS statistics and alarm status for VC 160 based on the measured QoS parameters.

After setting up the timer and cell-arrival interrupts, TA 410 generates a dialogue box for displaying the QoS measurements and QoS statistics (step 704). Specifically, the QoS measurements displayed may include, for example, cell transfer delay. Cell transfer delay represents the difference between transmission time-stamp and receive time-stamp in the payload of a cell. The QoS statistics displayed in the dialogue box may include, for example, the total number of cells transmitted, the total number of cells received, cell delay variation, cell loss ratio, minimum cell transfer delay, maximum cell transfer delay, and average cell transfer delay, which are specified in ATM Forum, *Traffic Management Specification Version* 4.0, ATM Forum/95-0013R10, Feburary 1996.

FIG. 7b is a flow chart of the steps that TA 410 performs when TA 410 receives a timer interrupt in accordance with an embodiment of the invention. At fixed intervals after step 702, TA 410 receives a timer interrupt (step 722). TA 410 then determines QoS statistics for VC 160 as follows (step 724): TA 410 reads from database 415 the QoS measurements for the last cell that arrived on VC 160. TA 410 compares the cell transfer delay measured for the last cell with the maximum cell transfer delay and the minimum cell transfer delay stored in database 415. If the cell transfer delay is greater than the maximum cell transfer delay, TA 410 sets the maximum cell transfer delay to the cell transfer delay of the last cell. If the cell transfer delay is smaller than the minimum cell transfer delay for VC 160, then TA 410 sets the minimum cell transfer delay to the cell transfer delay of the last cell. Finally, based on the cell transfer delay of the last cell, TA 410 computes a new average cell transfer delay by adding cell transfer delays for each cell that TG 405 transmits and TA 410 receives and dividing the sum by the total number of cells that TA 410 receives.

If TA 410 computes a new maximum cell transfer delay or a minimum cell transfer delay, then TA 410 computes a new cell delay variation by subtracting the minimum cell transfer delay from the maximum cell transfer delay. TA 410 then computes a new cell loss ratio as follows: TA 410 increments a cell-loss counter by subtracting the sequence number of a newly arrived cell from the sequence number of the previous cell that TA 410 received minus 1. TA 410 then divides the content of the cell-loss counter by the sequence number of the newly arrived cell. Finally, TA 410 stores the newly computed QoS statistics in database 415.

TA 410 determines alarm status information for VC 160 by comparing the QoS statistics determined in step 724 with the baseline QoS parameters for VC 160 as follows (step 726): TA 410 reads from database 415 the baseline QoS parameters, which may include, for example, average cell transfer delay, cell delay variation, and cell loss ratio. If TA 410 determines that any of the QoS statistics for VC 160 exceeds any of the baseline QoS parameters, TA 410 updates the alarm information, which TA 410 stores as the difference between the QoS statistics and the baseline QoS. Finally, TA 410 displays the newly computed QoS statistics and alarm status information in the dialogue box for displaying QoS statistics and QoS measurements (step 728). Then, TA 410 returns to the point in processing where TA 410 received the timer interrupt (step 730).

FIG. 7c is a flow chart of the steps that TA 410 performs when TA 410 receives a cell-arrival interrupt in accordance with an embodiment of the invention. When a cell arrives at adapter card 235, interrupt controller 325 generates an interrupt in CPU 210, causing adapter driver 208 to insert a receive time-stamp in the payload of the newly received cell (step 732). The steps that adapter driver 208 performs to insert a receive time-stamp into the payload of a newly received cell are described below in detail.

TA 410 then measures the QoS for VC 160 based on the time-stamp and sequence number information in the payload of the cell as follows (step 734): TA 410 reads the sequence number, the transmission time-stamp, and the receive time-stamp from payload of the cell. TA 410 computes the cell transfer delay for that cell by subtracting the transmission time-stamp from the receive time-stamp, stores the result in database 415, and displays the result in the previously generated dialogue box (step 736). Then, TA 410 returns to the point in processing at which point TA 410 received the cell-arrival interrupt (step 738).

The flow charts of FIGS. 8 through 11 collectively describe the steps that adapter driver 208 and adapter firmware 302 may perform when time-stamping ATM cells in accordance with an embodiment of the invention. However, in an alternative embodiment, a monitoring station may generally perform these same steps to time-stamp packets when transmitting and receiving packets in a communications network other than an ATM network. For example, a monitoring station may perform the steps of FIGS. 8 through 11 described below to time-stamp packets for monitoring the performance of a packet-switched communications network.

Figure 8:
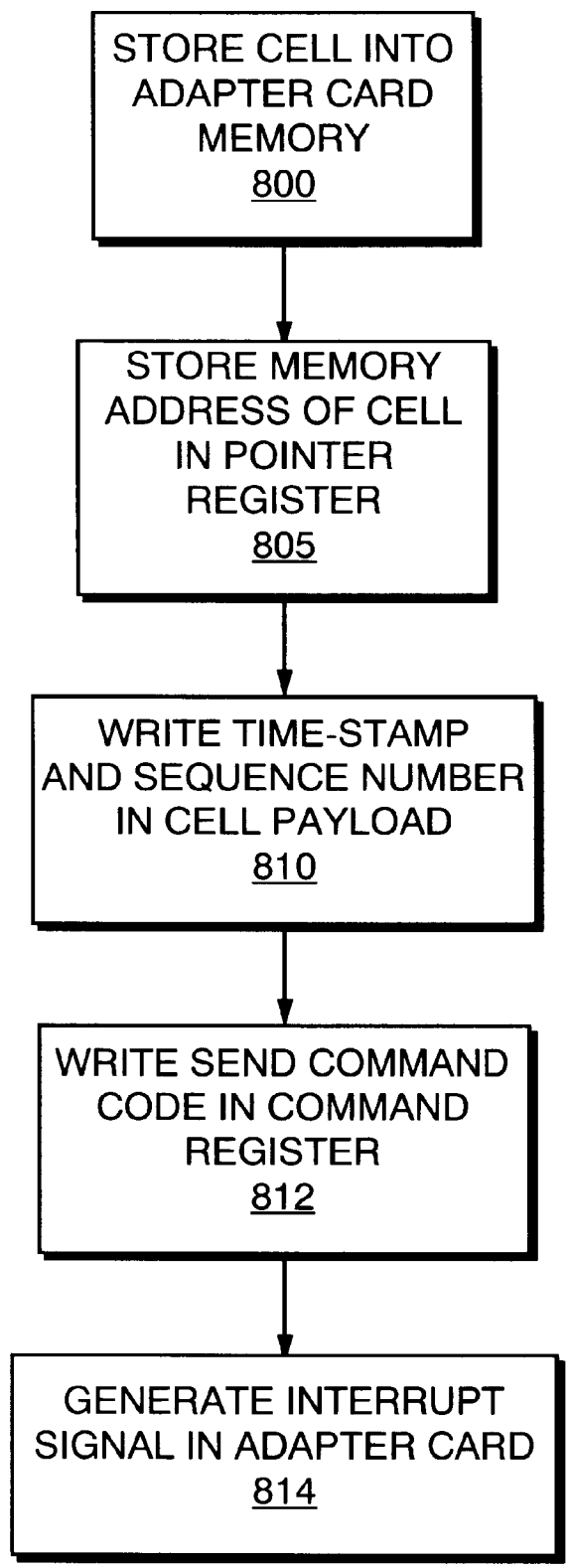
FIG. 8 illustrates a flow chart of the steps that an adapter driver in a monitoring system performs when transmitting a cell in accordance with an embodiment of the invention.

FIG. 8 is a flow chart of the steps that adapter driver 208 performs when transmitting a cell in accordance with an embodiment of the invention. Adapter driver 208 stores the cell in adapter card memory 305 (step 800), and stores the address of the cell in the pointer register of Tx register bank 334 (step 805). Adapter driver 208 inserts a time-stamp and a sequence number in the payload of the cell (step 810). Adapter driver 208 then writes a SEND command into the command register of Tx register bank 334 (step 812), which triggers interrupt controller 325 to generate a hardware interrupt in adapter card 235 (step 814).

Figure 9:
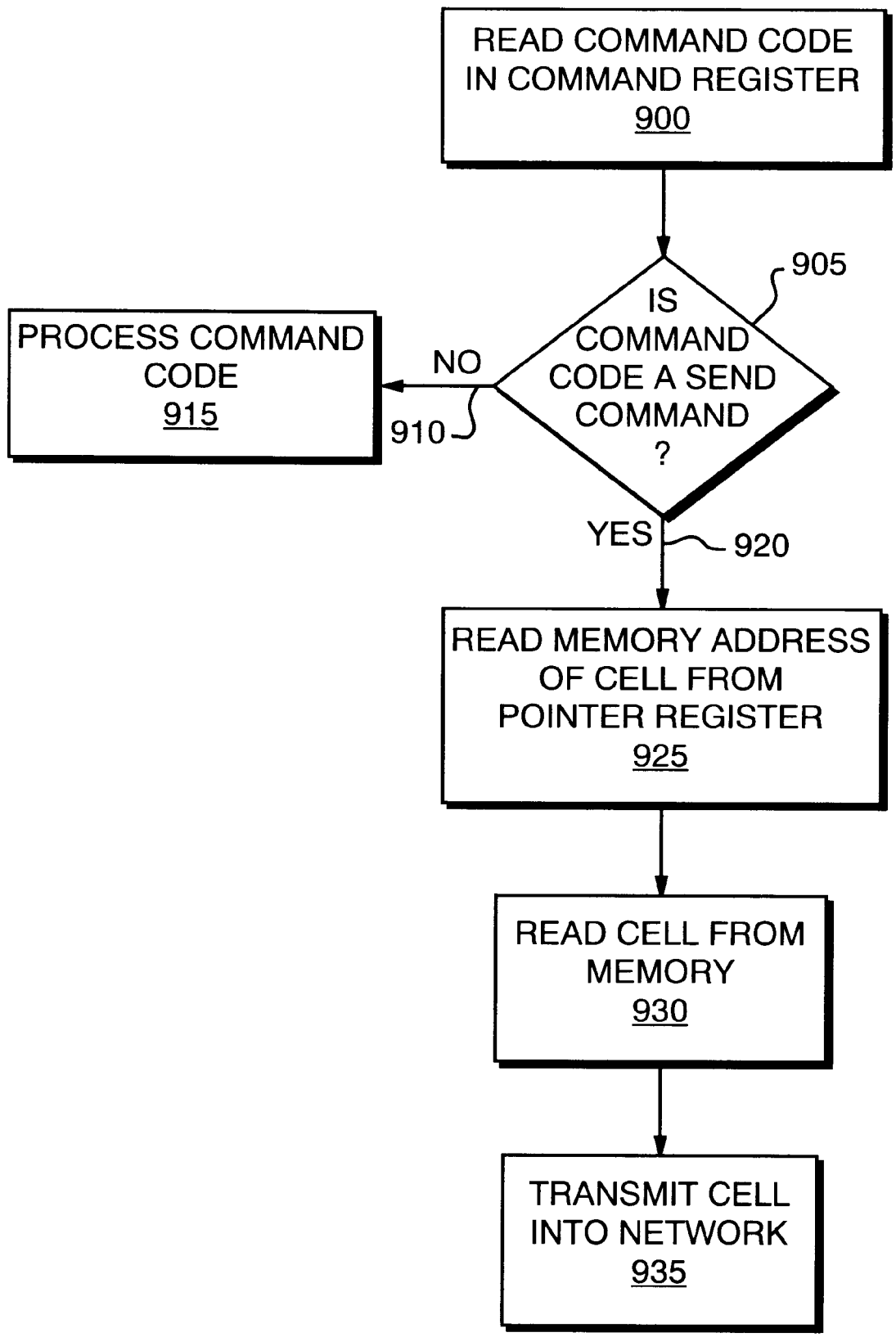
FIG. 9 illustrates a flow chart of the steps that an adapter card in a monitoring system performs when transmitting a cell in accordance with an embodiment of the invention.

FIG. 9 is a flow chart of the steps that adapter card 235 performs when interrupt controller 325 generates a hardware interrupt in adapter card 235 in accordance with an embodiment of the invention. Adapter firmware 302 reads the command code in command register of Tx register bank 334. Adapter firmware 302 determines whether the command code is a SEND command (step 905). If the command code is not a SEND command (step 910), adapter firmware 302 processes the command code (step 915).

If the command code is a SEND command (step 920), adapter firmware 302 reads the address of the cell stored in adapter card memory 305 from the pointer register of Tx register bank 334 (step 925). Adapter firmware 302 then instructs DMA controller 320 to read the cell from adapter card memory 305 (step 930) and to transmit the cell via link interface 335 to network 140 (step 935).

Figure 10:
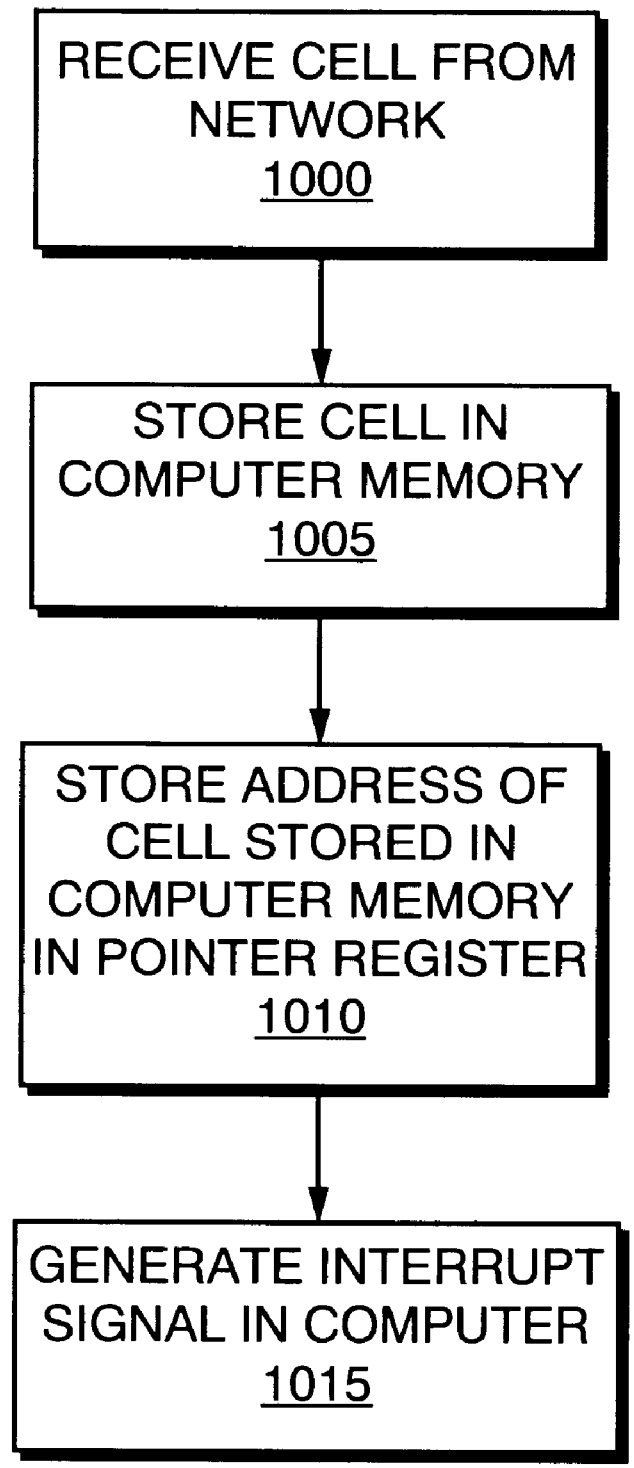
FIG. 10 illustrates a flow chart of the steps that an adapter card in a monitoring system performs when receiving a cell in accordance with an embodiment of the invention.

FIG. 10 is a flow chart of the steps that adapter card 235 performs when adapter card 235 receives a cell in accordance with an embodiment of the invention. Adapter card 235 receives a cell from network 140 via link interface 335 (step 1000). Adapter firmware 302 stores the cell in memory unit 200 via peripheral bus interface 315, peripheral bus 260, and peripheral bus interface 225 (step 1005). Adapter card 235 stores the memory address of the cell in the pointer register of Rx register bank 332 (step 1010). Then, interrupt controller 325 generates an interrupt in CPU 210 (step 1015).

Figure 11:
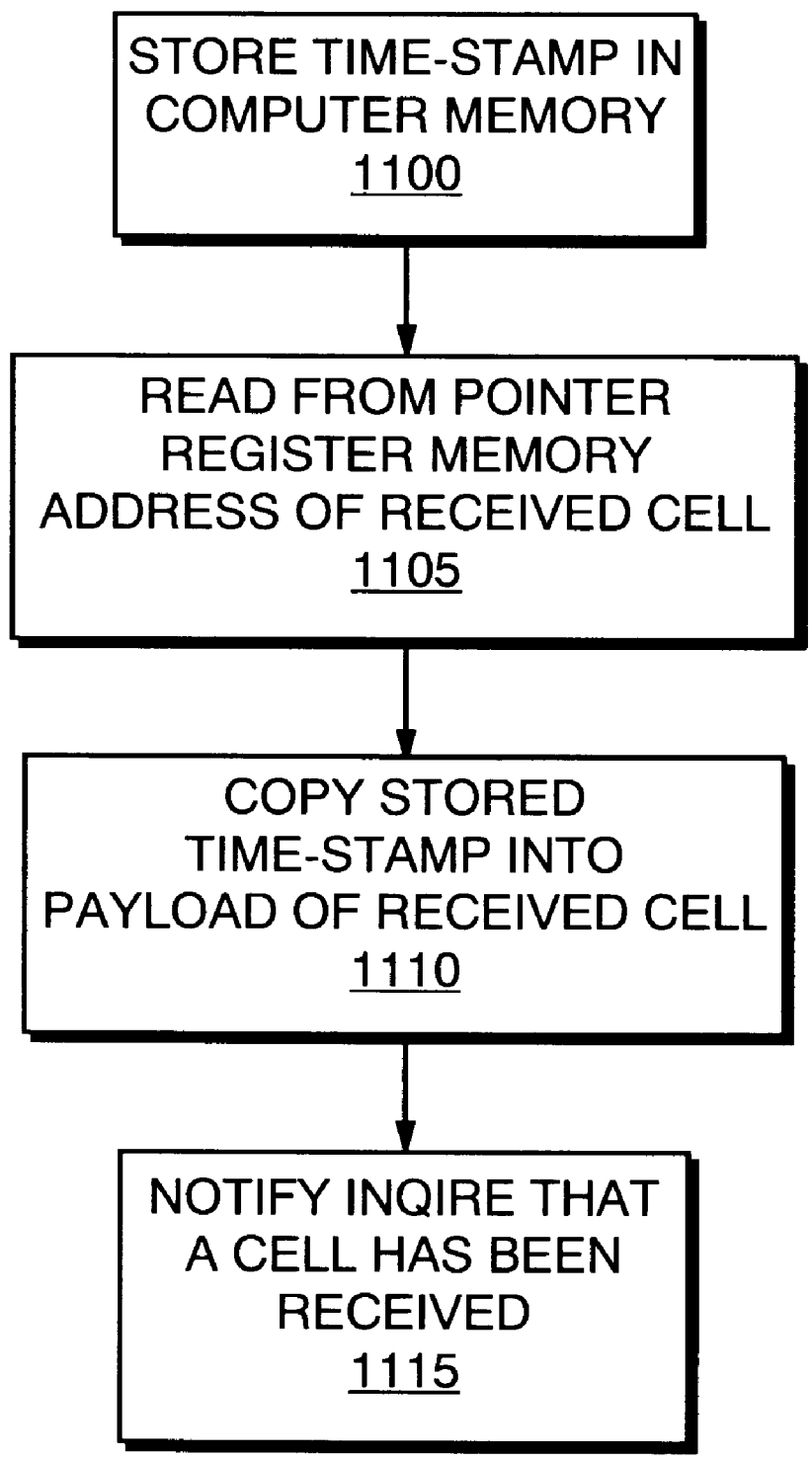
FIG. 11 illustrates a flow chart of the steps that an adapter driver in a monitoring system performs when receiving a cell in accordance with an embodiment of the invention.

FIG. 11 is a flow chart of the steps that adapter driver 208 performs when CPU 210 receives an interrupt in accordance with an embodiment of the invention. Adapter driver 208 generates a time-stamp for the current time and stores the time-stamp in memory unit 200 (step 1100). Adapter driver 208 reads memory address of cell from the pointer register of the Rx register bank 332 (step 1105). Adapter driver 208 copies the stored time-stamp into the payload of the received cell (step 1110). Adapter driver 208 then generates a cell-arrival interrupt in TA 410 (step 1115).

As explained above, when monitoring station 100A measures the end-to-end QoS in VC 160 based on round-trip transmission time of cells, monitoring station 100B does not insert QoS monitoring information into the payload of the cells before transmitting the cells back to monitoring station 100A. However, in an embodiment where monitoring station 100A measures the end-to-end QoS in VC 160 based on one-way transmission time of cells, monitoring station 100B must insert a time-stamp in the payload of each cell before transmitting the cell back to monitoring station 100A. Thus, in such an embodiment, monitoring station 100A must be synchronized to monitoring station 100B in order to make accurate and consistent QoS measurements.

Monitoring stations 100A and 100B may use various methods for clock synchronization in accordance with an embodiment of the present invention. For example, Global Positioning System (GPS) receivers can periodically synchronize ground systems to a constellation of orbiting satellites to within, for example, 10 ns or better. Alternatively, monitoring stations 100A and 100B may use the network time protocol (NTP) to periodically synchronize to Internet time servers. The accuracy depends on the stratum level of the time servers and the method of connection to the time servers. Alternatively, monitoring stations 100A and 100B may periodically synchronize to a common server through circuit-switched connections. Each monitoring station could set up a circuit-switched link to the common server, and send a message to the server. The server time-stamps the message and returns the message to the monitoring station. The monitoring station can deduce the propagation delay as half of the round-trip delay, and add the propagation delay to each time-stamp in order to synchronize the monitoring station to the common server clock time.

Figure 12:
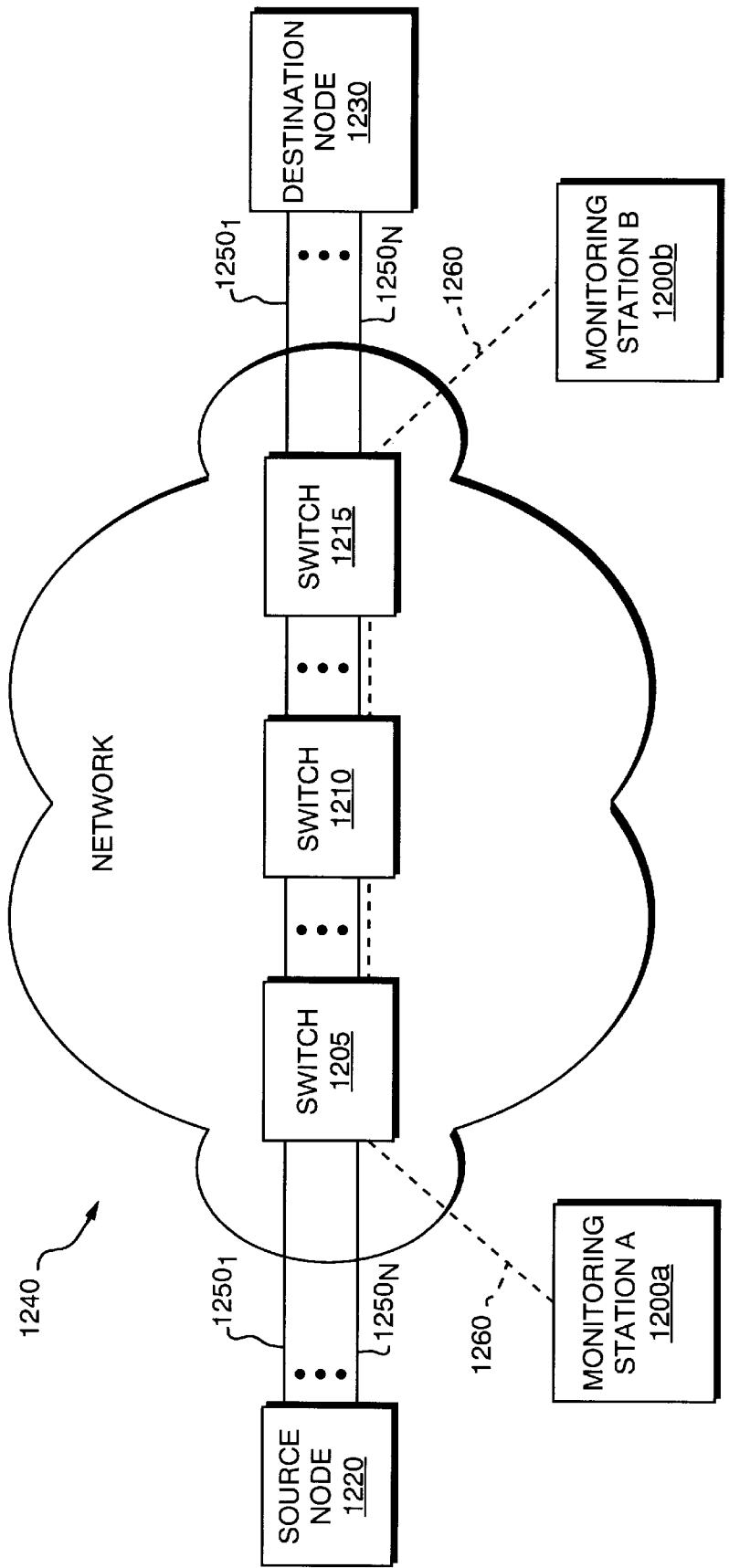
FIG. 12 illustrates a block diagram of a communications network with monitoring stations for monitoring a group of virtual circuits in accordance with an embodiment of the invention.

FIG. 12 is a block diagram of a communications network 1240, which includes monitoring stations for monitoring a group of virtual circuits in accordance with an embodiment of the invention. As shown, network 1240 comprises monitoring stations 1200A and 1200B, source node 1220, destination node 1230, and switches 1205, 1210, and 1215, which, for example, may be ATM switches. Specifically, source node 1220 communicates with destination node 1230 through a group of virtual circuits (VCs) 1250$_1$ through 1250$_N$, which pass through switches 1205, 1210, and 1215. VCs 1250$_1$ through 1250$_N$ each have the same path through switches 1205, 1210, and 1215 and QoS parameters. Monitoring station 1200A communicates monitoring information with monitoring station 1200B through VC 1260, which has the same path and QoS parameters as VCs 1250$_1$ through 1250$_N$. Furthermore, monitoring station 1200A may comprise the structure of monitoring station 100A described in FIGS. 2 through 4 above. Accordingly, monitoring station 1200A may monitor the end-to-end QoS in VCs 1250$_1$ through 1250$_N$ by performing the steps in FIGS. 5 through 11 described above.

Figure 13:
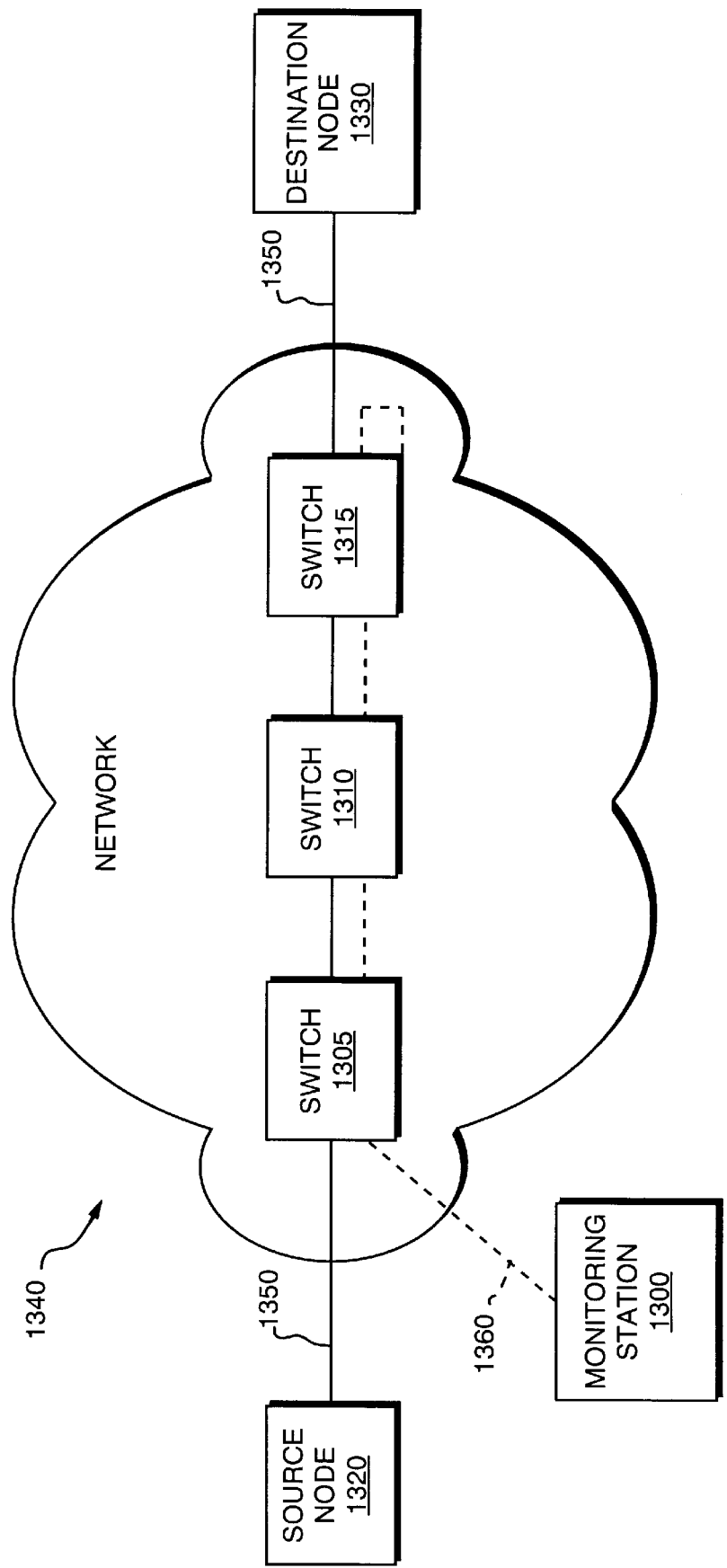
FIG. 13 illustrates a block diagram of a communications network with a single monitoring station in accordance with an embodiment of the invention.

In yet another embodiment of the present invention, a single monitoring station can monitor a single virtual circuit (VC) or a group of virtual circuits (VCs) in a communications network 1340. FIG. 13 illustrates a block diagram of network 1340, which includes monitoring station 1300, source node 1320, destination node 1330, virtual circuits (VC) 1350 and 1360, and switches 1305, 1310, and 1315, which, for example, may be ATM switches. Source node 1320 communicates with destination node 1330 via VC 1350. As shown, VCs 1350 and 1360 each pass through switches 1305, 1310, and 1315, and have the same path and QoS parameters as each other. Accordingly, monitoring station 1300 monitors the QoS parameters of VC 1350 by monitoring the QoS parameters of VC 1360. Specifically, monitoring station 1300 may, for example, include a personal computer (PC) with an ATM adapter card, and may operate by performing the steps described in flow charts of FIGS. 5 through 11.

A network management program (not shown) in monitoring station 1300, or alternatively in a different computer, establishes VC 1360 with the same path and QoS parameters as VC 1350 by specifying the input port and the output port in each switch 1305, 1310, and 1310 through which VC 1360 passes. Furthermore, the network management program configures switch 1315 so that VC 1360 loops-back in switch 1315. With the loop-back configuration, switch 1315 routes the cells that monitoring station 1300 transmits within switch 1315 and transmits the cells back to monitoring station 1300 via switches 1310 and 1305. Accordingly, monitoring station 1300 can monitor the end-to-end QoS parameters of VC 1350 by determining the QoS parameters of VC 1360.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for monitoring a first virtual circuit in a network, the first virtual circuit having a path and a first set of quality of service (QoS) parameters, said method comprising the steps, performed by at least one processor, of:

establishing in the network a second virtual circuit comprising the path and the first set of quality of service parameters;

determining a second set of quality of service parameters for the second virtual circuit; and monitoring the first virtual circuit by comparing one or more of the determined second set of quality of service parameters with one or more of the first set of quality of service parameters.

2. The method of claim 1, wherein said monitoring step further comprises the step of:

determining a cell transfer delay in the second virtual circuit.

3. The method of claim 1, wherein said monitoring step further comprises the step of:

determining a cell delay variation in the second virtual circuit.

4. The method of claim 1, wherein said monitoring step further comprises the step of:

determining a cell loss ratio in the second virtual circuit.

5. The method of claim 1, wherein said monitoring step further comprises the step of:

determining a maximum cell transfer delay in the second virtual circuit.

6. The method of claim 1, wherein said monitoring step further comprises the step of:

determining a minimum cell transfer delay in the second virtual circuit.

7. The method of claim 1, wherein said monitoring step further comprises the step of:

determining an average cell transfer delay in the second virtual circuit.

8. The method of claim 1, wherein said monitoring step further comprises the steps of:

time-stamping a cell when transmitting the cell on the second virtual circuit; and time-stamping the cell when receiving the cell on the second virtual circuit.

9. A computer for monitoring a first virtual circuit in a network, the first virtual circuit having a path and a set of quality of service parameters, said computer comprising:

a connection manager for establishing a connection to a second virtual circuit with the path and the first set of quality of service parameters;

a traffic generator for transmitting a plurality of cells on the second virtual circuit; and a traffic analyzer for monitoring the first virtual circuit by determining a second set of quality of service parameters in the second virtual circuit.

10. The computer of claim 9, wherein said traffic analyzer further comprises means for comparing the second set of quality of service parameters with the first set of quality of service parameters.

11. The computer of claim 9, wherein said traffic analyzer further comprises means for determining a cell transfer delay in the second virtual circuit.

12. The computer of claim 9, wherein said traffic analyzer further comprises means for determining a cell delay variation in the second virtual circuit.

13. The computer of claim 9, wherein said traffic analyzer further comprises means for determining a cell loss ratio in the second virtual circuit.

14. The computer of claim 9, wherein said traffic analyzer further comprises means for determining a maximum cell transfer delay in the second virtual circuit.

15. The computer of claim 9, wherein said traffic analyzer further comprises means for determining a minimum cell transfer delay in the second virtual circuit.

16. The computer of claim 9, wherein said traffic analyzer further comprises means for determining an average cell transfer delay in the second virtual circuit.

17. A method for monitoring a group of virtual circuits in a network, the group of virtual circuits each having a path and a first set of quality of service (QoS) parameters, said method comprising the steps, performed by at least one Processor, of:

establishing in the network a second virtual circuit comprising the path and the first set of quality of service parameters;

determining a second set of quality of service parameters for the second virtual circuit; and monitoring the group of virtual circuits by comparing one or more of the determined second set of quality of service parameters with one or more of the first set of quality of service parameters.

18. The method of claim 17, wherein said monitoring step further comprises the step of:

determining a cell transfer delay in the second virtual circuit.

19. The method of claim 17, wherein said monitoring step further comprises the step of:

determining a cell delay variation in the second virtual circuit.

20. The method of claim 17, wherein said monitoring step further comprises the step of:

determining a cell loss ratio in the second virtual circuit.

21. The method of claim 17, wherein said monitoring step further comprises the step of:

determining a maximum cell transfer delay in the second virtual circuit.

22. The method of claim 17, wherein said monitoring step further comprises the step of:

determining a minimum cell transfer delay in the second virtual circuit.

23. The method of claim 17, wherein said monitoring step further comprises the step of:

determining an average cell transfer delay in the second virtual circuit.

24. The method of claim 17, wherein said monitoring step further comprises the steps of:

time-stamping a cell when transmitting the cell on the second virtual circuit; and time-stamping the cell when receiving the cell on the second virtual circuit.

25. A computer-readable medium capable of configuring a computer to perform a method for monitoring a first virtual circuit in a network, the first virtual circuit having a path and a first set of quality of service (QoS) parameters, said method comprising the steps, performed by at least one processor, of:

establishing in the network a second virtual circuit comprising the path and the first set of quality of service parameters;

determining a second set of quality of service parameters for the second virtual circuit; and monitoring the first virtual circuit by comparing one or more of the determined second set of quality of service parameters with one or more of the first set of quality of service parameters.

* * * * *